(12) United States Patent
Wu (10) Patent No.: US 8,798,101 B2
(45) Date of Patent: Aug. 5, 2014

(54) METHOD AND APPARATUS FOR MEASURING SWITCHING TIME OF ETHERNET RING NETWORK

(75) Inventor: Shaoyong Wu, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 85 days.

(21) Appl. No.: 13/518,373

(22) PCT Filed: Apr. 14, 2010

(86) PCT No.: PCT/CN2010/071776
§ 371 (c)(1),
(2), (4) Date: Jul. 5, 2012

(87) PCT Pub. No.: WO2010/148721
PCT Pub. Date: Dec. 29, 2010

(65) Prior Publication Data
US 2012/0263194 A1    Oct. 18, 2012

(30) Foreign Application Priority Data

Dec. 31, 2009  (CN) .......................... 2009 1 0265790

(51) Int. Cl.
*H04J 3/06* (2006.01)
(52) U.S. Cl.
USPC .......................................... 370/503; 370/258
(58) Field of Classification Search
USPC .......... 370/258, 400, 406, 222, 324, 350, 305
See application file for complete search history.

(56) References Cited

U.S. PATENT DOCUMENTS

| 6,545,976 | B1  | 4/2003 | Gentile et al. |
| 7,649,912 | B2* | 1/2010 | Balasubramanian et al. 370/509 |
| 7,912,094 | B2* | 3/2011 | Hall et al. ..................... 370/508 |

FOREIGN PATENT DOCUMENTS

| CN | 101102235 A | 1/2008 |
| CN | 101247636 A | 8/2008 |
| CN | 101345662 A | 1/2009 |

* cited by examiner

*Primary Examiner* — Brenda H Pham
(74) *Attorney, Agent, or Firm* — McAndrews Held & Malloy, Ltd.

(57) ABSTRACT

The present invention provides a method for measuring switching time of an Ethernet ring network, which comprises the following steps: synchronizing a local time of each node in the Ethernet ring network (301); when switching occurs in the Ethernet ring network, each node recording its own start time of the switching and end time of the switching (302); comparing all the time of the switching to obtain a maximum end time of the switching and a minimum start time of the switching among all the nodes, and calculating a difference between the maximum end time of the switching and the minimum start time of the switching (303) to serve as the switching time of the Ethernet ring network. The present invention also provides an apparatus for measuring switching time of the Ethernet ring network. By applying the method and apparatus, the switching time of the Ethernet ring network can be measured precisely, which facilitates the maintenance, fault location and service influence estimation etc. of the Ethernet ring network.

12 Claims, 5 Drawing Sheets

METHOD AND APPARATUS FOR MEASURING SWITCHING TIME OF ETHERNET RING NETWORK

FIELD OF THE INVENTION

The present invention relates to an Ethernet ring network switching technology, and more particularly, to a method and an apparatus for measuring switching time of an Ethernet ring network.

BACKGROUND OF THE INVENTION

The existing Ethernet is developing into a direction of multiple service carriers, and as some services require higher network reliability and better real-time network performance etc., a redundant networking manner has been widely applied in the Ethernet to improve the network reliability. In the redundant networking structure of the Ethernet, it is usually required that the speed of a protection switching is fast enough, and the time length of the protection switching should be within 50 ms. Currently, technologies relating to rapid protection switching comprise the RFC3619 standard put forward by the Internet Engineering Task Force (IETF) and the G.8032 standard put forward by the International Telecommunication Union (ITU-T) etc.

In the G.8032 standard put forward by the ITU-T, automatic protection switching protocol and mechanism are defined for an Ethernet layer of a ring topological Ethernet. The automatic protection switching method is applicable to the ring topological Ethernet and the implementation process of the method is as follows. In the ring topological Ethernet, one link is selected as a ring protection link, when there is no fault in all links of the Ethernet ring network, a port connected with the ring protection link is blocked by at least one of two adjacent nodes of the ring protection link, so as to prevent the protected data from passing through the ring protection link. In this way, there is a unique communication path between any two nodes on the Ethernet ring network, therefore closed loop of the communication path will not occur in the Ethernet ring network, thus preventing closed loop and networking storm. When a fault occurs in a link which is not the ring protection link in the Ethernet ring network, the node which previously blocks the port connected with the ring protection link opens the blocked port, to enable the protected data to pass through the ring protection link so as to establish the communication path over again and improve the network reliability.

Figure 1:
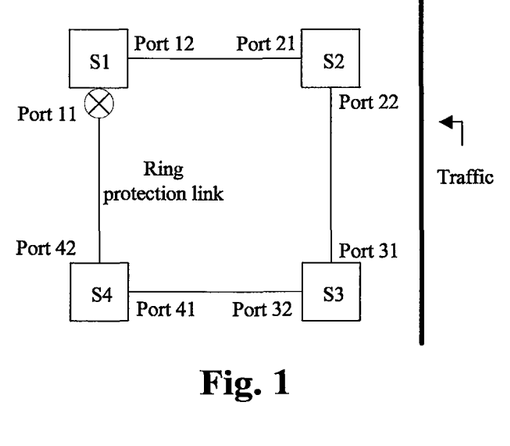
FIG. 1 is a structural schematic diagram illustrating the Ethernet ring network based on the G.8032 standard.

FIG. 1 shows a schematic diagram illustrating an Ethernet ring network structure based on the G.8032 standard. As shown in FIG. 1, Node S1, Node S2, Node S3 and Node S4 form the Ethernet ring network. The link between Node S1 and Node S4 is the ring protection link. Node S1 is the node to which the ring protection link belongs and controls to block and open Port 11 so as to block and open the ring protection link. When there is no fault in all links of the Ethernet ring network, Port 11 is blocked by Node S1 to prevent the protected data from passing through the ring protection link, and at the moment, the protected data flow communication path between Node S2 and S3 is S2<->S3 only and cannot be S2<->S1<->S4<->S3.

Figure 2:
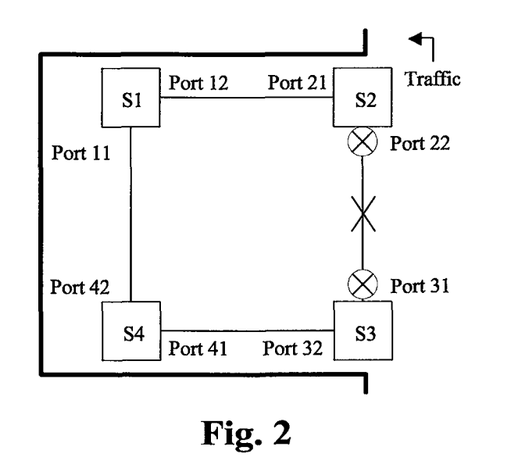
FIG. 2 is a structural schematic diagram illustrating the Ethernet ring network as shown in FIG. 1 after a fault occurs in a link.

FIG. 2 shows a structural schematic diagram illustrating the Ethernet ring network as shown in FIG. 1 after a fault occurs in a link. As shown in FIG. 2, provided that a link failure is detected by Node S2 and Node S3, then Node S2 and Node S3 respectively block Port 22 and Port 31 connected with the link where a fault occurs and send a link failure alarm protocol frame to notify other nodes to perform protection switching. After receiving the link failure alarm protocol frame, Node S1, to which the ring protection link belongs, opens the blocked Port 11 which is connected with the ring protection link. An address forwarding table is refreshed by each node on the Ethernet ring network to realize network protection switching. The protected data can pass through the opened ring protection link, and at the moment the communication path of the protected data between Node S2 and Node S3 is S2<->S1<->S4<->S3. Here, the link failure is only one of the situations which cause the protection switching, during actual applications, other situations such as manual switching and forced switching etc. may be further included.

In the Ethernet ring network, the time required by the switching process needs to be learned when the protection switching is performed so as to evaluate the protection performance of the Ethernet ring network system, the service influence and so on. During the communication process, data packets are transmitted and received at a constant speed in the Ethernet ring network. When switching is not performed in the Ethernet ring network, a transmitted packet count should be equal to a received packet count on the same node. When switching is performed in the Ethernet ring network, there will be a loss of a data packet flow to some extent.

A traditional method for measuring the switching time comprises that: the received packet count is deducted from the transmitted packet count of the same node to obtain a lost packet count during the switching process, and then the lost packet count is divided by a packet transmission speed or a packet receiving speed to obtain the switching time. However, during actual applications of the Ethernet ring network, both the data transmission and receiving speed and path are not constant. Therefore, there is a relatively significant difference between the measured switching time and the actual switching time. This measuring method is only an ideal measuring means, which cannot be applied to the actual Ethernet ring network.

Another method for measuring the switching time comprises that: the switching time is calculated via the start and end moments recoded by a node, i.e. in the Ethernet ring network structure, each node calculates its own switching time independently and operates an independent state machine. Since the time among all nodes is not synchronized and the time difference among all the nodes is unknown, or the error of the difference is larger than 50 ms, the switching time of the whole Ethernet ring network cannot be obtained from the switching time of each node. Or if all nodes are synchronized, the time precision is low because the time synchronization operation among all nodes is configured manually, e.g. the time can only be accurate to seconds, which is hard to meet the requirement of the measurement precision, thus bringing great difficulty in measuring the switching time of the Ethernet ring network.

SUMMARY OF THE INVENTION

In view of the above, the present invention provides a method and an apparatus for measuring switching time of an Ethernet ring network, which can accurately measure the switching time of the Ethernet ring network.

The technical solution of the present invention is as follows.

The present invention provides a method for measuring switching time of an Ethernet ring network, comprising:

synchronizing local time of each node in the Ethernet ring network;

when a switching occurs in the Ethernet ring network, each node recording its own start time of the switching and end time of the switching; and comparing to obtain a maximum end time of the switching and a minimum start time of the switching among all nodes, and calculating a difference between the maximum end time of the switching and the minimum start time of the switching to serve as the switching time of the Ethernet ring network.

Preferably, the step of synchronizing the local time of each node in the Ethernet ring network comprises:

in the Ethernet ring network, a node having a blocked port sending a synchronization protocol frame, which carries a current local time, to other nodes except the node itself; after receiving the synchronization protocol frame, said other nodes setting their respective local time as the time in the synchronization protocol frame.

Preferably, the method for the node having a blocked port to send the synchronization protocol frame to other nodes comprises:

the node having a blocked port sending the synchronization protocol frame to said other nodes periodically and continuously; or the node having a blocked port sending the synchronization protocol frame to said other nodes according to a first period at first, and then sending the synchronization protocol frame to said other nodes continuously according to a second period until the port is in an opened state.

Preferably, the first period is shorter than the second period.

Preferably, in the solution above, the node having a blocked port is a node having a blocked port on a ring protection link, or a node whose port is blocked on a link where a fault occurs.

Preferably, in the solution above, the synchronization protocol frame sent by the node having a blocked port further comprises: a local identification number of the node.

Preferably, the step of said other nodes setting their respective local time as the time in the synchronization protocol frame after receiving the synchronization protocol frame comprises:

after receiving the synchronization protocol frame, each of said other nodes judging whether or not there is a blocked port in the node itself, if it is judged that there is not a blocked port, setting the local time as the time in the synchronization protocol frame;

if it is judged that there is a blocked port, comparing the local identification number with the identification number in the synchronization protocol frame, if it is judged that the local identification number is smaller than the identification number in the synchronization protocol frame, setting the local time as the time in the synchronization protocol frame; if it is judged that the local identification number is larger than the identification number in the synchronization protocol frame, ending a local time synchronization operation;

or if it is judged that the local identification number is larger than the identification number in the synchronization protocol frame, setting the local time as the time in the synchronization protocol frame; if it is judged that the local identification number is smaller than the identification number in the synchronization protocol frame, ending the local time synchronization operation.

The present invention also provides an apparatus for measuring switching time of an Ethernet ring network, comprising: a time synchronization module and a time recording module on each node, and a comparison module and a calculation module at a management system side of the Ethernet ring network, wherein the time synchronization module is configured to synchronize local time of each node in the Ethernet ring network and send a synchronization result to the time recording module on the respective node;

the time recording module is configured to start timing, on each node, based on the synchronized time, and when a switching occurs in the Ethernet ring network, record a start time of the switching and an end time of the switching of each node, and send a recorded result to the comparison module at the management system side of the Ethernet ring network;

the comparison module is configured to compare, at the management system side of the Ethernet ring network, the recorded result sent by the time recording module of each node, select a maximum end time of the switching and a minimum start time of the switching among all nodes, and send the two selected time values to the calculation module; and the calculation module is configured to compare a difference between the maximum end time of the switching and the minimum start time of the switching sent by the comparison module and take the difference as the switching time of the Ethernet ring network.

According to the method and the apparatus provided by the present invention for measuring switching time of an Ethernet ring network, the local time of each node in the Ethernet ring network is synchronized; when a switching occurs in the Ethernet ring network, each node records its own start time of the switching and end time of the switching; comparison is performed to obtain the maximum end time of the switching and the minimum start time of the switching among all the nodes, and the difference between the maximum end time of the switching and the minimum start time of the switching is calculated to obtain the switching time of the Ethernet ring network. In accordance with the present invention, after time synchronization is realized in each node, the switching time of the whole Ethernet ring network can be calculated according to the measured start time and end time of the switching of each node without involving parameters such as the packet transmitting and receiving speed etc. in the existing calculation methods. The implementation method is simple and convenient, and the measured switching time has been accurate to milliseconds. Therefore, by applying the present invention, the switching time of the Ethernet ring network can be measured precisely, which facilitates the maintenance, fault location and service influence estimation etc. of the Ethernet ring network.

DETAILED DESCRIPTION OF THE EMBODIMENTS

The basic idea of the embodiments of the present invention is that: local time of each node in an Ethernet ring network is synchronized; when a switching occurs in the Ethernet ring network, each node records its own start time of the switching and end time of the switching; comparison is performed to obtain a maximum end time of the switching and a minimum start time of the switching among all nodes, and a difference between the maximum end time of the switching and the minimum start time of the switching is calculated to obtain switching time of the Ethernet ring network.

The present invention is further described below in details according to the accompanying drawings and embodiments.

Figure 3:
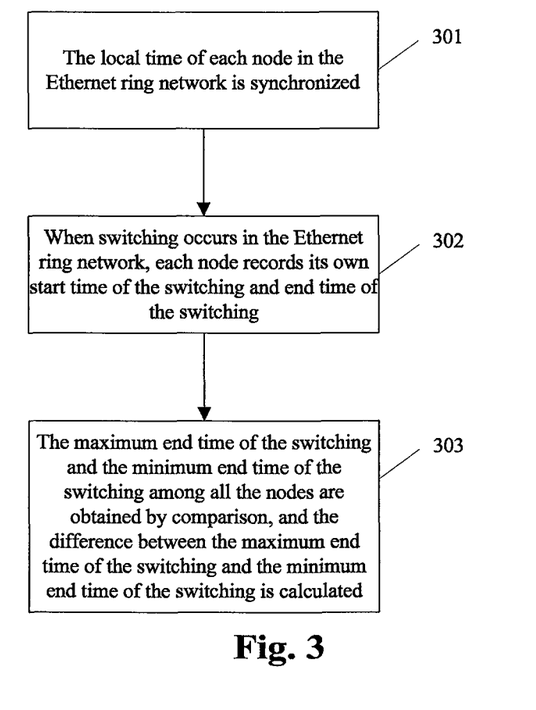
FIG. 3 is a schematic diagram illustrating a process for realizing a method for measuring switching time of an Ethernet ring network in accordance with an embodiment of the present invention.

FIG. 3 is a schematic diagram illustrating a process for realizing a method for measuring switching time of an Ethernet ring network in accordance with an embodiment of the present invention. As shown in FIG. 3, the process comprises the steps as follows.

Step 301: the local time of each node in the Ethernet ring network is synchronized.

Specifically, the step comprises: in the Ethernet ring network, a node having a blocked port sends a synchronization protocol frame to other nodes except the node itself. After receiving the synchronization protocol frame, said other nodes set their respective local time as the time in the synchronization protocol frame so that the time is synchronized among all nodes in the Ethernet ring network.

In the above, besides a local identification number of the current node, the current local time of the current node is added in the synchronization protocol frame sent by the node having a blocked port.

In the embodiment of the present invention, the node having a blocked port may be a node having a blocked port on a ring protection link, or a node whose port is blocked on a link where a fault occurs.

Step 302: when a switching occurs in the Ethernet ring network, each node records its own start time of the switching and end time of the switching.

Specifically, the step comprises: after the time is synchronized among all nodes in the Ethernet ring network, each node starts timing based on the synchronized time, i.e. an existing time counter of each node starts to time the local time based on the synchronized time; when a switching occurs in the Ethernet ring network, each node records its own start time of the switching and end time of the switching.

Step 303: comparison is performed to obtain the maximum end time of the switching and the minimum start time of the switching among all the nodes, and the difference between the maximum end time of the switching and the minimum start time of the switching is calculated to serve as the switching time of the Ethernet ring network.

Specifically, the step comprises: after the switching of all nodes is ended, the end time of the switching recorded by each node is compared by a management system side of the Ethernet ring network, the maximum end time of the switching is selected from the end time of the switching of each node; the start time of the switching of each node is compared and the minimum start time of the switching is selected from the start time of the switching of each node; the difference between the maximum end time of the switching and the minimum start time of the switching is calculated, and the difference is the measured and obtained switching time of the whole Ethernet ring network.

Figure 4:
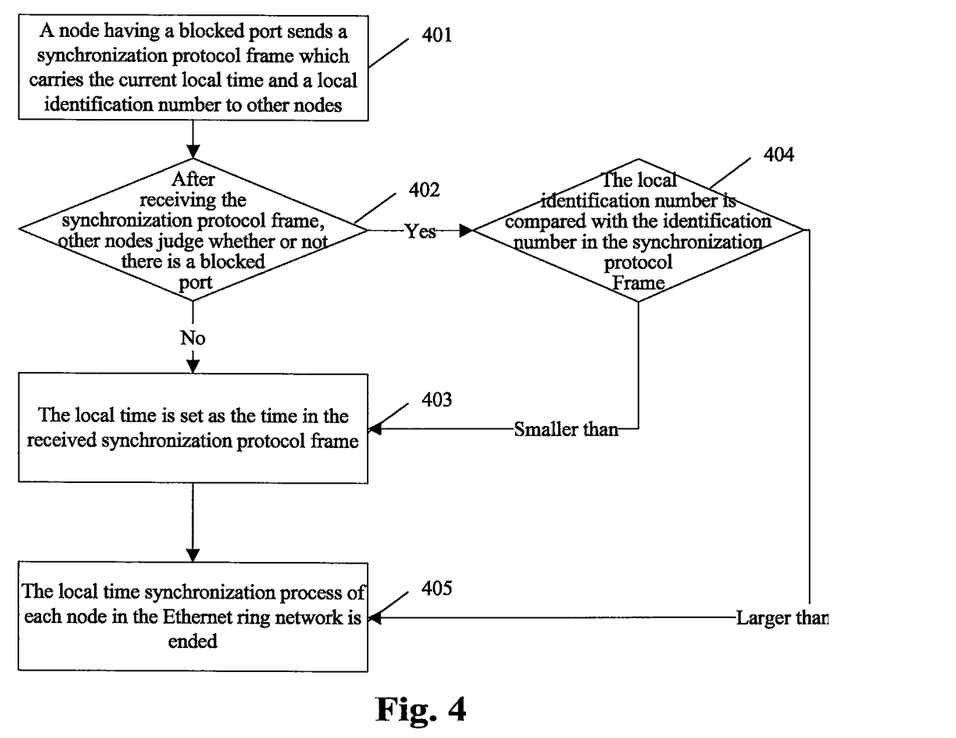
FIG. 4 is a schematic diagram illustrating a specific implementation process of synchronizing the local time of each node in the Ethernet ring network in accordance with an embodiment of the present invention.

FIG. 4 is a schematic diagram illustrating a specific implementation process of synchronizing the local time of each node in the Ethernet ring network in Step 301. As shown in FIG. 4, the specific implementation process of the method comprises:

Step 401: a node having a blocked port sends a synchronization protocol frame, which carries the current local time and a local identification number, to other nodes.

Specifically, the step comprises: a node having a blocked port in the Ethernet ring network sends a synchronization protocol frame, which carries the current local time and the local identification number, to other nodes, wherein the local identification number is an identification number corresponding to each node, e.g. S1, S2, S3 . . . , and so on and the number in the local identification number is arranged in order, e.g. 1, 2, 3 etc.

In the above, the method for the node having a blocked port to send a synchronization protocol frame to other nodes is described as follows.

The node having a blocked port sends a synchronization protocol frame to other nodes according to a certain period, e.g. 10 ms, continuously until the port on the node having a blocked port is in an opened state; or the node having a blocked port sends a synchronization protocol frame to other nodes according to a first period at first, and then sends a synchronization protocol frame to other nodes continuously according to a second period until the port of the node having a blocked port is in an opened state, wherein the first period is shorter than the second period, e.g. the first period is set as 6 ms while the second period is set as 20 ms.

Here, in order to prevent the synchronization protocol frame from being damaged during the sending process, the synchronization protocol frame needs to be sent to other nodes continuously. In the second solution, the reason why the synchronization protocol frame is sent according to a shorter period at first and then according to a longer period is that: in order to enable other nodes to receive the synchronization protocol frame as soon as possible, the synchronization protocol frame needs to be sent to other nodes in a very short period of time; however, in order to reduce various processing performed after each node receives the synchronization protocol frame, in other words, in order to reduce resource consumption during processing of the synchronization protocol frame by each of other nodes, the period for subsequently sending the synchronization protocol frame is prolonged.

Step 402: after receiving the synchronization protocol frame, each of other nodes judge whether or not there is a blocked port in the node itself, if it is determined that there is not a blocked port, Step 403 is performed; otherwise, Step 404 is performed.

Step 403: the local time is set as the time in the received synchronization protocol frame and then Step 405 is performed.

Step 404: the local identification number is compared with the identification number in the synchronization protocol frame, if it is determined that the local identification number is smaller than the identification number in the synchronization protocol frame, Step 403 is performed; otherwise, Step 405 is performed.

Here, the identification number comparison strategy can also be set as "larger than". In other words, when the local identification number is larger than the identification number in the synchronization protocol frame, the local time is set as the time in the received synchronization protocol frame; when the local identification number is smaller than the identification number in the synchronization protocol frame, Step 405 is performed. The purpose for comparing the identification numbers is that: when a plurality of nodes having a blocked port in the Ethernet ring network sends the synchronization protocol frame at the same time, e.g. when the nodes at two ends of a link where a fault occurs send the synchronization protocol frame, the nodes having a blocked port can be prevented from performing the time synchronization for each other so as to avoid the situation that time synchronization always cannot be realized between two nodes.

In the above, the reason why Step 405 is performed when it is determined that the local identification number is larger than the identification number in the synchronization protocol frame is that: provided that there are two nodes which send the synchronization protocol frame and it is specified that other nodes perform the time synchronization operation based on the local time of the node with a smaller identification number in the two nodes which send the synchronization protocol frame. However, the node with a larger identification number may also send the synchronization protocol frame at the moment. If the node with a smaller identification number receives the synchronization protocol frame sent by the node with a larger identification number, since the time synchronization is performed based on the node with a smaller identification number at the moment, the time synchronization operation is not performed. In this way, the time of the two nodes having a blocked port is synchronized first, therefore, the time in the synchronization protocol frame received by other nodes is the time to be achieved by the synchronization.

Step 405: the local time synchronization process of each node in the Ethernet ring network is ended.

Here, after the time synchronization is ended, the existing time counter of each node starts timing based on the synchronized time.

Figure 5:
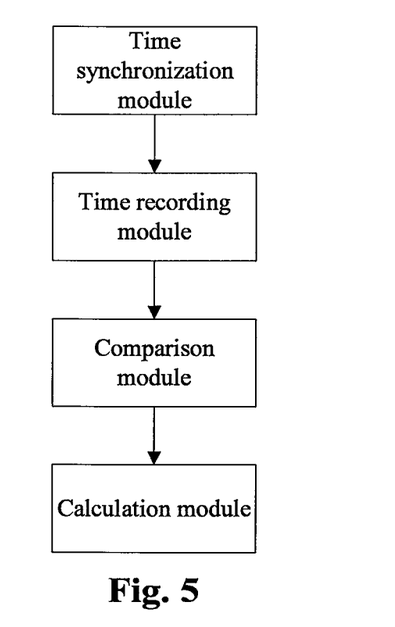
FIG. 5 is a structural schematic diagram illustrating an apparatus for measuring switching time of an Ethernet ring network in accordance with an embodiment of the present invention.

FIG. 5 is a structural schematic diagram illustrating an apparatus for measuring switching time of an Ethernet ring network in accordance with an embodiment of the present invention. As shown in FIG. 5, the apparatus comprises: a time synchronization module and a time recording module on each node, and a comparison module and a calculation module at a management system side of the Ethernet ring network, wherein the time synchronization module is configured to synchronize the local time of each node in the Ethernet ring network and send the synchronization result to the time recording module on the respective node;

the time recording module is configured to start timing on each node based on the synchronized time, and when switching occurs in the Ethernet ring network, record the start time of the switching and the end time of the switching of each node, and send the recorded result to the comparison module at the management system side of the Ethernet ring network;

the comparison module is configured to compare, at the management system side of the Ethernet ring network, the recorded result sent by the time recording module of each node, select the maximum end time of the switching and the minimum start time of the switching among all the nodes, and send the two selected time values to the calculation module; and the calculation module is configured to compare the difference between the maximum end time of the switching and the minimum start time of the switching sent by the comparison module and take the difference as the switching time of the Ethernet ring network.

The present invention is further described below in details according to an embodiment.

Figure 6:
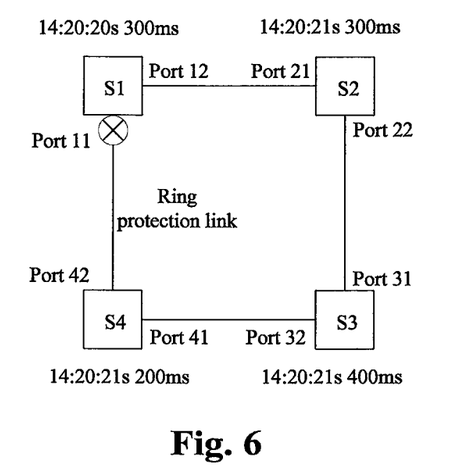
FIG. 6 is a structural schematic diagram illustrating the Ethernet ring network before time synchronization of each node in accordance with an embodiment of the present invention.

FIG. 6 is a structural schematic diagram illustrating the Ethernet ring network of the embodiment. Node S1, Node S2, Node S3 and Node S4 form the Ethernet ring network. The link between Node S1 and Node S4 is the ring protection link. Node S1 is the node to which the ring protection link belongs. At the moment, there is no link failure in the Ethernet ring network and Port 11 is blocked by Node S1. At a certain moment before each node performs the time synchronization, the local time of Node S1 is 14:20:20 s 300 ms, the local time of Node S2 is 14:20:21 s 300 ms, the local time of Node S3 is 14:20:21 s 400 ms, and the local time of Node S4 is 14:20:21 s 200 ms. The time error, which is more than 50 ms, is relatively large among respective nodes.

The implementation steps of the embodiment are as follows.

Figure 7:
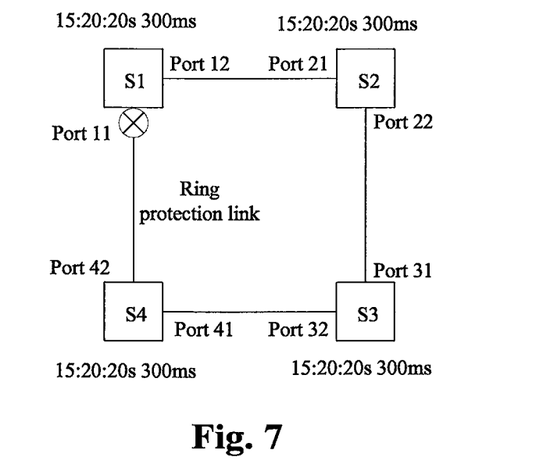
FIG. 7 is a structural schematic diagram illustrating the Ethernet ring network after time synchronization of each node in accordance with an embodiment of the present invention.

Node S1 sends a synchronization protocol frame to Node S2, Node S3 and Node S4 periodically. Since there is not a blocked port at Node S2, Node S3 and Node S4, after receiving the synchronization protocol frame, these three nodes directly set their respective local time as the time in the synchronization protocol frame. As shown in FIG. 7, the local time of each node is synchronized as 15:20:20 s 300 ms.

Figure 8:
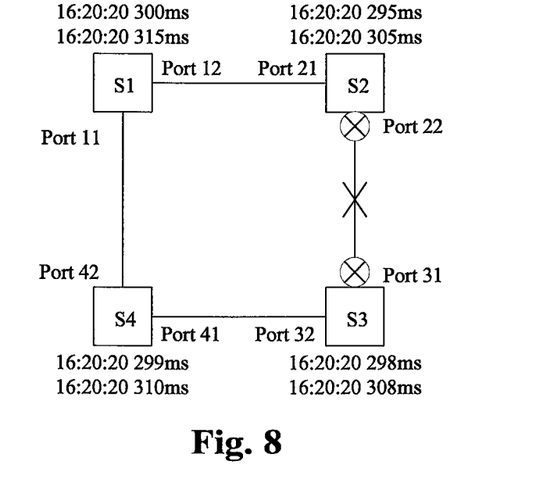
FIG. 8 is a structural schematic diagram illustrating the Ethernet ring network after a fault occurs in a link in accordance with an embodiment of the present invention.

When a fault occurs in a link and switching needs to be performed, as shown in FIG. 8, Node S2 and Node S3 detect a link failure. Then, Node S2 and Node S3 respectively block Port 22 and Port 31 connected with the link where the fault occurs, and a link failure alarm protocol frame is sent to notify other nodes to perform protection switching. After receiving the link failure alarm protocol frame, other nodes start timing, i.e. recording the start time of the switching. Node S1 opens Port 11 and each node performs operations such as refreshing an address forwarding table etc. After the switching is completed, each node records the end time of the switching. For example, the start time of the switching recorded by Node S1 is 16:20:20 s 300 ms, and the end time of the switching is 16:20:20 s 315 ms; the start time of the switching recorded by Node S2 is 16:20:20 s 295 ms, and the end time of the switching is 16:20:20 s 305 ms; the start time of the switching recorded by Node S3 is 16:20:20 s 298 ms, and the end time of the switching is 16:20:20 s 308 ms; the start time of the switching recorded by Node S4 is 16:20:20 s 299 ms, and the end time of the switching is 16:20:20 s 310 ms. In the start time and end time of the switching recorded by each node, the maximum end time of the switching is 16:20:20 s 315 ms recorded by Node S1, and the minimum start time of the switching is 16:20:20 s 295 ms recorded by Node S1. The difference between the maximum end time of the switching and the minimum start time of the switching is the switching time, which is 20 ms, of the Ethernet ring network.

Thus, the process for measuring the switching time of the Ethernet ring network in the embodiments of the present invention does not involve parameters such as the packet transmitting and receiving speed etc. and the measured switching time has been accurate to milliseconds. In the embodiments of the present invention, after each node achieves the time synchronization, the switching time of the whole Ethernet ring network can be calculated via the measured start time and end time of the switching of each node and the implementation method is simple and convenient.

The above are only preferable embodiments of the present invention and should not be used to limit the present invention. Any modifications, equivalent replacements, improvements and the like within the principle of the present invention shall fall within the scope of protection of the present invention.

What is claimed is:

1. A method for measuring switching time of an Ethernet ring network, comprising:
    synchronizing local time of each node in the Ethernet ring network;
    when a switching occurs in the Ethernet ring network, each node recording its own start time of the switching and end time of the switching; and
    comparing to obtain a maximum end time of the switching and a minimum start time of the switching among all nodes, and calculating a difference between the maximum end time of the switching and the minimum start time of the switching to serve as the switching time of the Ethernet ring network.

2. The method for measuring switching time of an Ethernet ring network according to claim 1, wherein the step of synchronizing the local time of each node in the Ethernet ring network comprises:
    in the Ethernet ring network, a node having a blocked port sending a synchronization protocol frame, which carries a current local time, to other nodes except the node itself; after receiving the synchronization protocol frame, said other nodes setting their respective local time as the time in the synchronization protocol frame.

3. The method for measuring switching time of an Ethernet ring network according to claim 2, wherein the method for the node having a blocked port to send the synchronization protocol frame to other nodes comprises:
    the node having a blocked port sending the synchronization protocol frame to said other nodes periodically and continuously; or
    the node having a blocked port sending the synchronization protocol frame to said other nodes according to a first period at first, and then sending the synchronization protocol frame to said other nodes continuously according to a second period until the port is in an opened state.

4. The method for measuring switching time of an Ethernet ring network according to claim 3, wherein the first period is shorter than the second period.

5. The method for measuring switching time of an Ethernet ring network according to any one of claims 2 to 4, wherein the node having a blocked port is a node having a blocked port on a ring protection link, or a node whose port is blocked on a link where a fault occurs.

6. The method for measuring switching time of an Ethernet ring network according to claim 2, wherein the synchronization protocol frame sent by the node having a blocked port further comprises: a local identification number of the node.

7. The method for measuring switching time of an Ethernet ring network according to claim 2, wherein the step of said other nodes setting their respective local time as the time in the synchronization protocol frame after receiving the synchronization protocol frame comprises:
    after receiving the synchronization protocol frame, each of said other nodes judging whether or not there is a blocked port in the node itself; if it is judged that there is not a blocked port, setting the local time as the time in the synchronization protocol frame;
    if it is judged that there is a blocked port, comparing the local identification number with the identification number in the synchronization protocol frame, if it is judged that the local identification number is smaller than the identification number in the synchronization protocol frame, setting the local time as the time in the synchronization protocol frame; if it is judged that the local identification number is larger than the identification number in the synchronization protocol frame, ending a local time synchronization operation;
    or if it is judged that the local identification number is larger than the identification number in the synchronization protocol frame, setting the local time as the time in the synchronization protocol frame; if it is judged that the local identification number is smaller than the identification number in the synchronization protocol frame, ending the local time synchronization operation.

8. An apparatus for measuring switching time of an Ethernet ring network, comprising a hardware processor configured to execute following modules:
    a time synchronization module and a time recording module on each node, and a comparison module and a calculation module at a management system side of the Ethernet ring network, wherein
    the time synchronization module is configured to synchronize local time of each node in the Ethernet ring network and send a synchronization result to the time recording module on the respective node;
    the time recording module is configured to start timing, on each node, based on the synchronized time, and when a switching occurs in the Ethernet ring network, record a start time of the switching and an end time of the switching of each node, and send a recorded result to the comparison module at the management system side of the Ethernet ring network;
    the comparison module is configured to compare, at the management system side of the Ethernet ring network, the recorded result sent by the time recording module of each node, select a maximum end time of the switching and a minimum start time of the switching among all nodes, and send the two selected time values to the calculation module; and
    the calculation module is configured to compare a difference between the maximum end time of the switching and the minimum start time of the switching sent by the comparison module and take the difference as the switching time of the Ethernet ring network.

9. The method for measuring switching time of an Ethernet ring network according to claim 3, wherein the synchronization protocol frame sent by the node having a blocked port further comprises: a local identification number of the node.

10. The method for measuring switching time of an Ethernet ring network according to claim 4, wherein the synchronization protocol frame sent by the node having a blocked port further comprises: a local identification number of the node.

11. The method for measuring switching time of an Ethernet ring network according to claim 3, wherein the step of said other nodes setting their respective local time as the time in the synchronization protocol frame after receiving the synchronization protocol frame comprises:
    after receiving the synchronization protocol frame, each of said other nodes judging whether or not there is a blocked port in the node itself; if it is judged that there is not a blocked port, setting the local time as the time in the synchronization protocol frame;

if it is judged that there is a blocked port, comparing the local identification number with the identification number in the synchronization protocol frame, if it is judged that the local identification number is smaller than the identification number in the synchronization protocol frame, setting the local time as the time in the synchronization protocol frame; if it is judged that the local identification number is larger than the identification number in the synchronization protocol frame, ending a local time synchronization operation;

or if it is judged that the local identification number is larger than the identification number in the synchronization protocol frame, setting the local time as the time in the synchronization protocol frame; if it is judged that the local identification number is smaller than the identification number in the synchronization protocol frame, ending the local time synchronization operation.

12. The method for measuring switching time of an Ethernet ring network according to claim 4, wherein the step of said other nodes setting their respective local time as the time in the synchronization protocol frame after receiving the synchronization protocol frame comprises:

after receiving the synchronization protocol frame, each of said other nodes judging whether or not there is a blocked port in the node itself, if it is judged that there is not a blocked port, setting the local time as the time in the synchronization protocol frame;

if it is judged that there is a blocked port, comparing the local identification number with the identification number in the synchronization protocol frame, if it is judged that the local identification number is smaller than the identification number in the synchronization protocol frame, setting the local time as the time in the synchronization protocol frame; if it is judged that the local identification number is larger than the identification number in the synchronization protocol frame, ending a local time synchronization operation;

or if it is judged that the local identification number is larger than the identification number in the synchronization protocol frame, setting the local time as the time in the synchronization protocol frame; if it is judged that the local identification number is smaller than the identification number in the synchronization protocol frame, ending the local time synchronization operation.

* * * * *